United States Patent
Tian et al.

(10) Patent No.: US 12,171,188 B2
(45) Date of Patent: Dec. 24, 2024

(54) LITTER DEVICE FOR PET

(71) Applicant: UBTECH ROBOTICS CORP LTD, Shenzhen (CN)

(72) Inventors: Kexin Tian, Shenzhen (CN); Yangming Qian, Shenzhen (CN); Jin Li, Shenzhen (CN); Yanhui Chai, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 68 days.

(21) Appl. No.: 17/887,536

(22) Filed: Aug. 15, 2022

(65) Prior Publication Data
US 2023/0309501 A1  Oct. 5, 2023

(30) Foreign Application Priority Data
Mar. 30, 2022  (CN) .......................... 202210332567.3

(51) Int. Cl.
*A01K 1/01* (2006.01)
(52) U.S. Cl.
CPC .................. *A01K 1/0114* (2013.01)
(58) Field of Classification Search
CPC ...... A01K 1/011; A01K 1/0107; A01K 31/04; A01K 1/0114
USPC .................................................. 119/166, 163
See application file for complete search history.

(56) References Cited

U.S. PATENT DOCUMENTS

| 7,341,022 | B2 * | 3/2008 | Ming | A01K 63/003 119/245 |
| 2002/0139312 | A1 * | 10/2002 | Reitz | A01K 1/0114 119/165 |
| 2013/0333625 | A1 * | 12/2013 | Baxter | A01K 1/011 119/166 |
| 2014/0245960 | A1 * | 9/2014 | Baxter | A01K 1/0114 119/166 |
| 2020/0060221 | A1 | 2/2020 | Fan et al. | |
| 2020/0281154 | A1 * | 9/2020 | Li | A01K 1/011 |
| 2022/0142114 | A1 * | 5/2022 | Baxter | A01K 1/0052 |

FOREIGN PATENT DOCUMENTS

| CN | 110367134 A | 10/2019 |
| CN | 210869228 U * | 6/2020 |
| CN | 114027202 A | 2/2022 |

OTHER PUBLICATIONS

Litter-Robot, "Litter-Robot_III-Manual-2015_Version", 2015 (Year: 2015).*
Litter-Robot, "Litter-Robot_II-Manual-New", 2014 (Year: 2014).*

* cited by examiner

*Primary Examiner* — Brady W Frazier
*Assistant Examiner* — Zoe Tam Tran (57) ABSTRACT

A pet litter device includes: a base configured to be placed on a support surface, the base defining a recessed portion that comprises a recess surface defining an opening, and a drum rotatably connected to the base and partly received in the recessed portion. The drum has an outer lateral surface. The recess surface and a portion of the outer lateral surface that faces the recess surface define a gap and form a passage in communication with the opening. The recess surface is to guide litter particles entering the passage to pass through the opening to fall on the support surface.

10 Claims, 15 Drawing Sheets

LITTER DEVICE FOR PET

CROSS REFERENCE TO RELATED APPLICATIONS

The application claims priority to Chinese Patent Application No. CN 202210332567.3, filed Mar. 30, 2022, which is hereby incorporated by reference herein as if set forth in its entirety.

BACKGROUND

1. Technical Field

The present disclosure generally relates to animal litter boxes and more particularly to a litter device that is rotated for segregating waste materials from clean litter.

2. Description of Related Art

Research has shown that cats can provide emotional support, improve moods, and contribute to the overall morale of their owners. As a result, cats are a great choice of pet.

Many automatic cat litter boxes have been around for a while. Typically, an automatic cat litter box includes a geared base and a roller. When in use, cat litter particles may tend to enter the tooth spaces of the gears of the base and the roller, and the space between the base and the roller. If cat litter particles fall into the tooth spaces, it may cause gear jamming. If cat litter particles fall into the space between the base and the roller, they may scratch the outer lateral surface of the roller, or even case the roller to be stuck.

Therefore, there is a need to provide a pet litter device to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
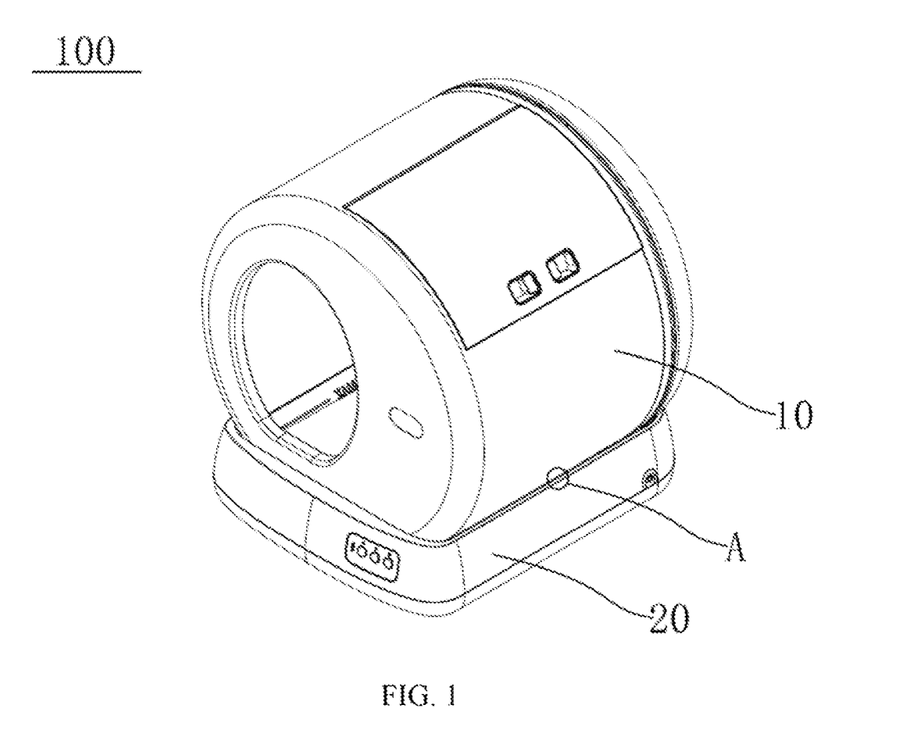
FIG. 1 is an isometric view of a pet litter device according to one embodiment.
Figure 2:
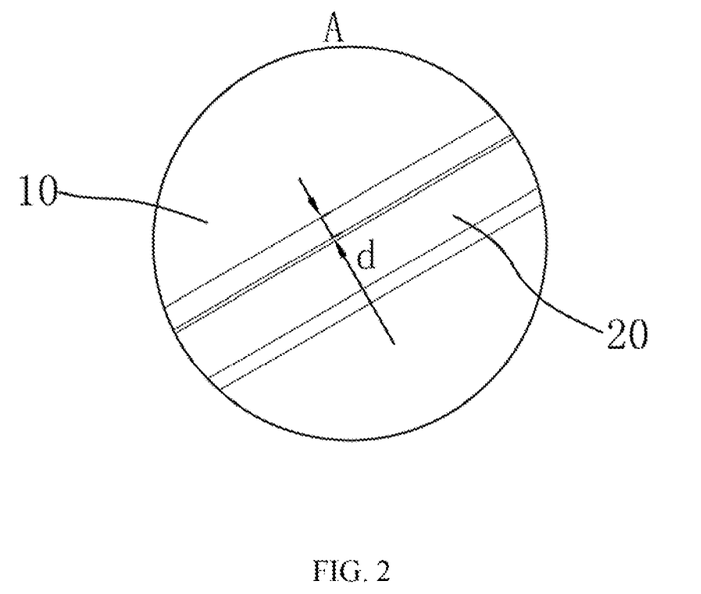
FIG. 2 is an enlarged view of a portion A in FIG. 1.
Figure 3:
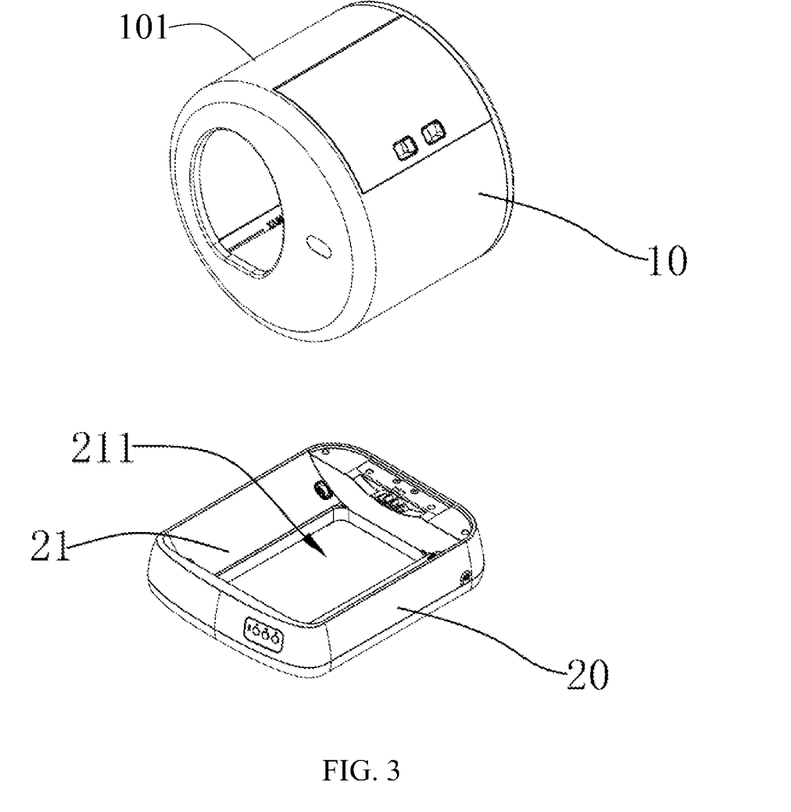
FIG. 3 is an isometric exploded view of the pet litter device according to one embodiment.
Figure 4:
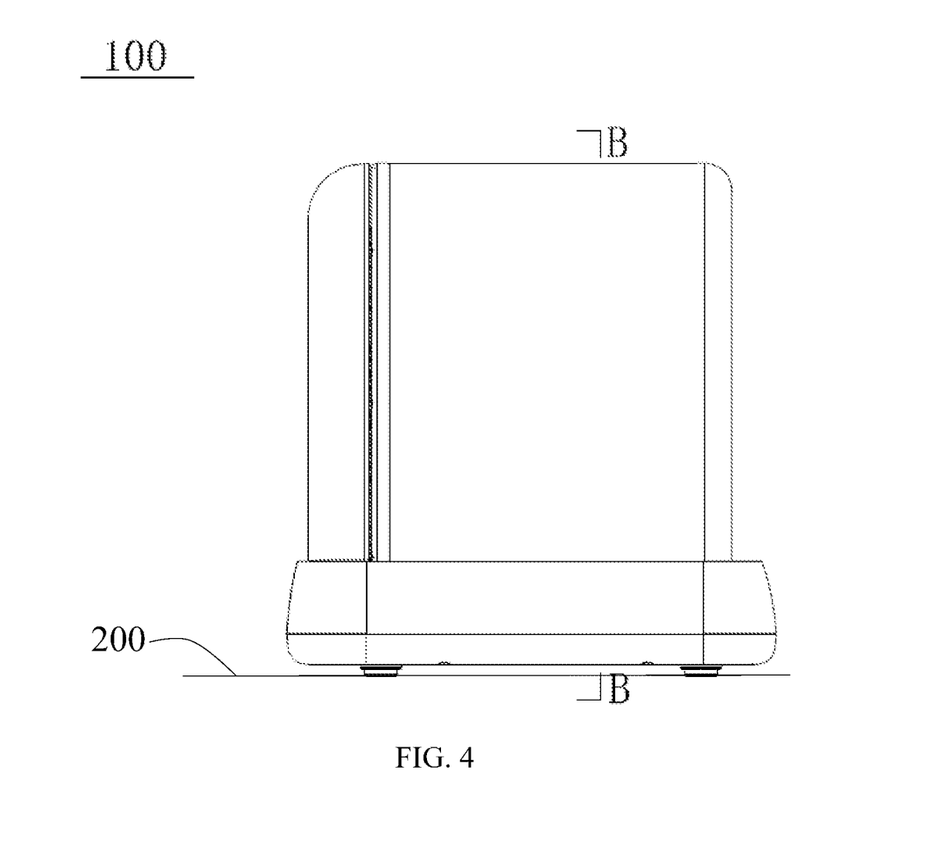
FIG. 4 is a planar view of the pet litter device.
Figure 5:
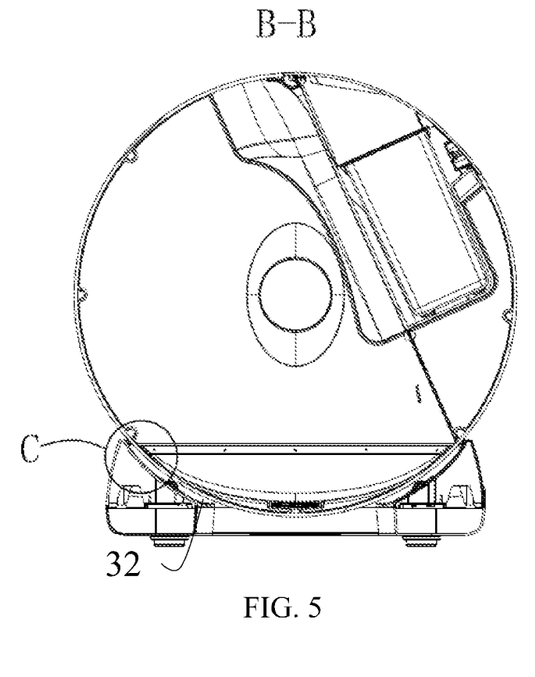
FIG. 5 is a cross-sectional view of the pet litter device taken along lines B-B in FIG. 4.
Figure 6:
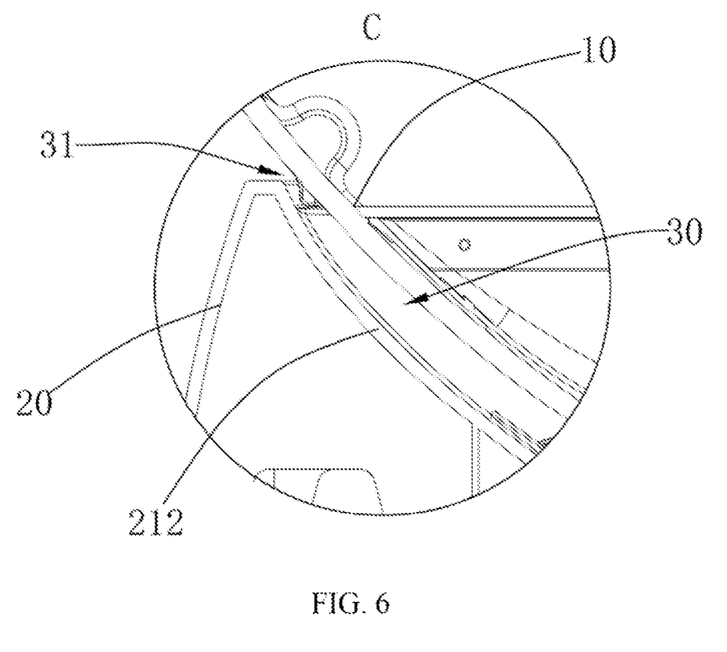
FIG. 6 is an enlarged view of a portion C in FIG. 5.

Referring to FIGS. 1-3, in one embodiment, a pet litter device 100 is provided for use with pets such as dogs and cats. The device 100 may include a base 20 and a drum 10. Referring to FIGS. 4-6, in one embodiment, the base 20 defines a recessed portion 21 in a surface (e.g., upper end surface in FIG. 3) facing the drum 10. The drum 10 is partly and rotatably received in the recessed portion 21. The recessed portion 21 has a recess surface 212 defining an opening 211. In one embodiment, the opening 211 is under the drum 10. The recess surface 212 and a portion of the outer lateral surface 101 of the drum 10 that faces the recess surface 212 define a gap d therebetween and form a passage 30 in communication with the opening 211. The recess surface 212 is to guide litter particles entering the passage 30 to pass through the opening 211 to fall on the support surface 200 (see FIG. 4) where the device 100 is placed. The support surface may be the ground, a table top, or other surfaces capable of supporting the device 100.

Figure 7:
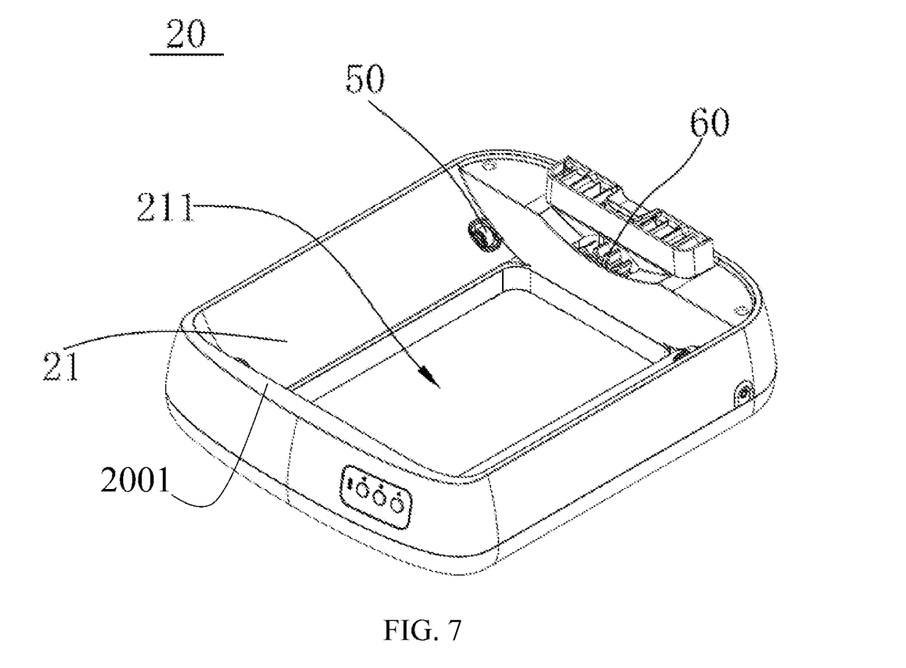
FIG. 7 is an isometric view of a base of the pet litter device.

Referring to FIG. 7, in one embodiment, the drum 10 can be cylindrical and supported by four rollers 50 partly received in the recess surface 212. One end of the drum is provided with a transmission gear that meshes with the output gear 60 of a drive motor, and rotates in place on the base 20 under the driving of the output gear 60 of the drive motor.

If tiny objects (e.g., cat litter particles) enter the passage 30, they will be guided by the recess surface 212, pass through the opening 211, and finally fall on support surface where the device 100 is placed. A user can then clean up the tiny objects (e.g., cat litter particles) on the support surface.

Compared with some conventional pet litter devices that requires the drum to be disassembled from the base when it needs to clean up litter particles between the base and the drum, the litter particles entering the passage 30 can automatically move out of the device 100 through the opening 211, which can free a user from manually disassembling the drum 10 from the base 20. Since the litter particles entering the passage 30 between the drum 10 and the recessed portion 21 can directly fall on the support surface, the litter particles will not accumulate between the drum 10 and the recessed portion 21, which can prevent the output gear 60 of the drive motor and the transmission gear from being jammed. This also avoids the problem that the litter particles accumulated between the drum 10 and the base 20 cause friction or adversely affect the rotation of the drum 10.

In one embodiment, an area of the opening 211 and an area of a cross-section of a portion of the drum 10 received in the recessed portion 21 satisfy the following relationship: $3A/5 \leq S \leq 2A/3$, where S represents the area of the opening 211, and A represents the area of the cross-section of a portion of the drum 10 received in the recessed portion.

In one embodiment, the opening 211 is a rectangular through hole, and the area of the opening 211 is equal to the product of the length and the width of the opening 211. The cross-section of a portion of the drum 10 received in the recessed portion means a transverse section of the drum 10 taken parallel to a horizontal surface when the device 100 is placed on the horizontal surface.

The limitation on the area of the opening 211, that is, the limitation on the size of the opening 211, can avoid the problem that tiny objects (e.g., cat litter particles) entering the passage 30 cannot easily fall from the opening 211 due to the small size of the opening 211. By limiting the proportion of the size of the opening 211 to the portion of the drum 10 received in the recessed portion 21, the tiny objects entering the passage 30 can fall on the support surface easily.

As shown in FIGS. 5-7, in one embodiment, the recess surface 212 extends downwardly from a top end 2001 of the base 20. The recess surface 212 can be an inclined surface or a concave surface.

In the embodiment, since the recess surface 212 is an inclined surface or a concave surface, the recessed portion 21 provides a ramp when the device 100 is placed on a horizontal surface. With such configuration, the tiny objects (e.g., cat litter particles) that enters the passage 30 can slide down the recess surface 212 toward the opening 211, and then pass through the opening 211 and fall on the support surface, which can avoid the problem that the litter particles accumulated between the drum 10 and the base 20 cause friction or adversely affect the rotation of the drum 10.

Referring to FIG. 6, in one embodiment, the passage 30 has an inlet 31 formed between a top end 2001 of the base 20 and the outer lateral surface 101, and an outlet 32 (see FIG. 5) formed between an edge of the opening 211 and the outer lateral surface 101. The inlet 31 is smaller in size than the outlet 32.

By setting the size of the inlet 31 of the passage 30 to be smaller than the size of the outlet of the passage 30, that is, by adopting a non-uniform design with narrow inlet and wide outlet, it allows the tiny objects (e.g., cat litter particles) to smoothly fall on the support surface through the opening 211. Specifically, at the inlet of the gap d (i.e., the inlet 31 of the passage 30) between the drum and the base 20, the gap d can be set to 3 mm, and the gap d gradually increases from the inlet to the opening 211. In this way, because the gap d gradually increases from the inlet to the opening 211, it is ensured that cat litter particles can smoothly move to the through hole 211 after they enter the inlet of the gap d.

In one embodiment, the area of the longitudinal section of the object channel 30 gradually increases from the inlet 31 of the passage 30 to the outlet of the passage 30.

Here, the longitudinal section of the passage 30 is taken perpendicular to a horizontal surface when the device 100 is placed on the horizontal surface. The area of the longitudinal section of the passage 30 gradually increases from the inlet 31 to the outlet, which follows the design principle of narrow inlet and wide outlet. Such a design makes it difficult for external objects to pass through the inlet 31 of the passage 30, and once tiny objects such as cat litter particles enter the passage 30, then can smoothly fall on support surface through the opening 211 along the passage 30.

Figure 8:
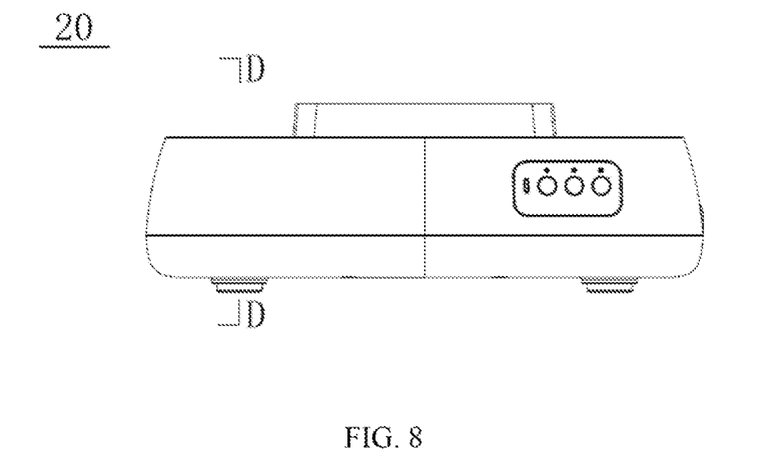
FIG. 8 is a planar view of the base of the pet litter device.
Figure 9:
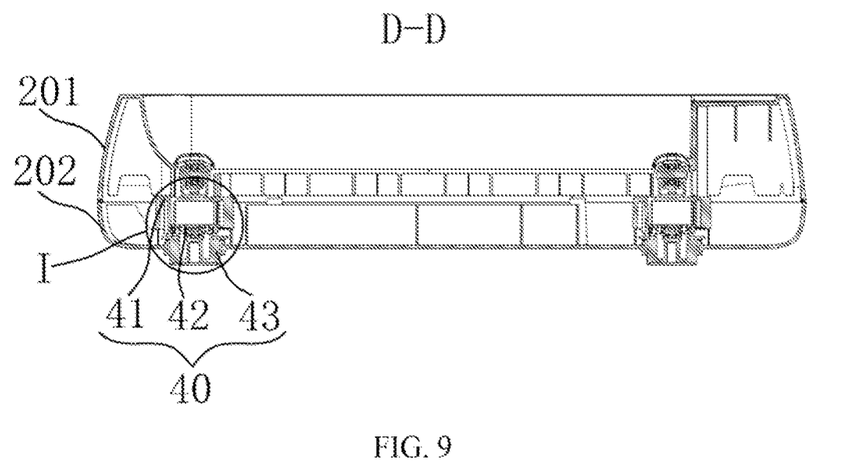
FIG. 9 is cross-sectional view of the base of the pet litter device, taken along lines D-D in FIG. 8.
Figure 10:
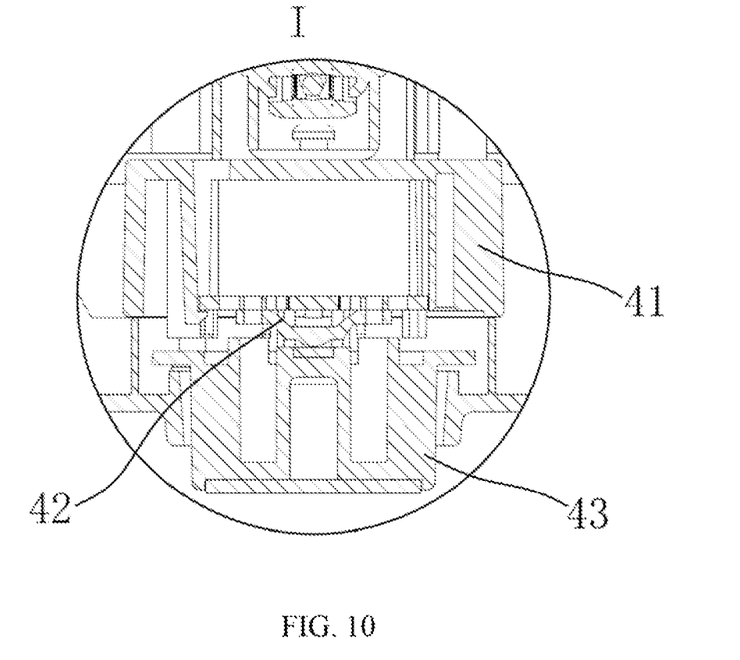
FIG. 10 is an enlarged view of a portion 1 in FIG. 9.

Referring to FIGS. 8-10, in one embodiment, the device 100 further includes a weight measuring mechanism 40 that is arranged in the base 20 and is to measure a weight of the litter device 100. When a pet (e.g., a cat) enter a pet access portal of the device 100, the measured weight will dramatically change. Based on the change in weight, the device 100 can determine that a pet has entered the pet access portal of the device 100.

In one embodiment, the weight measuring mechanism 40 may include a support member 41, a weight sensor 42, and a leg 43. The support member 41 is arranged in the base 20. The weight sensor 42 is connected to and arranged under the support member 41. For example, the weight sensor 42 is fixed to the support member 41 by screws. In another embodiment, the weight sensor 42 can be fixed to the support member 41 by glue or other adhesive medium.

The weight sensor 42 is connected to and arranged above the leg 43. The leg passes through the base 20 to be in contact with the support surface. When the device 100 is placed on the support surface (e.g., a floor), the leg 43 is in contact with the support surface. The leg 43 supports the weight sensor 42, and the base 20, the drum 10 and the weight sensor 42 press down the leg 43. At this time, the whole weight acts on the weight sensor 42 and transmitted to the leg 43 and the support surface. The whole weight can then be measured by the weight sensor 42.

Figure 13:
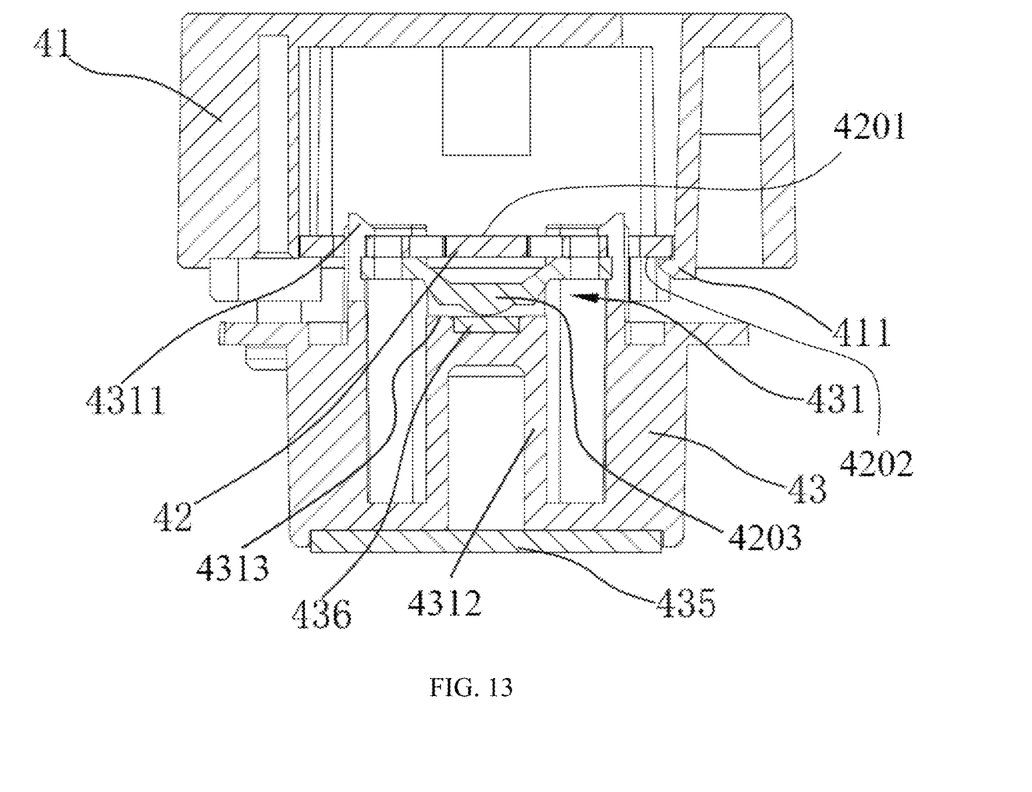
FIG. 13 is cross-sectional view of the weight measuring mechanism, taken along lines E-E in FIG. 12.

Referring to FIG. 13, in order to better support the weight sensor 42 and make the triggering of the weight sensor 42 more sensitive, the leg 43 may be provided a contact member 436 under the weight sensor 42. When the leg 43 is in contact with the support surface, the contact member 436 is in contact with the weight sensor 42. At this time, the whole weight acts on the weight sensor 42 and is transmitted to the leg 43 and the support surface.

In one embodiment, the contact member 436 are made of hard material, such as metal or plastic material.

It should be noted that the weight sensor 42 is electrically connected to a controller of the device 100. The controller may control the data measured by the weight sensor 42 on a display of the device 100. The controller and the display are conventional, which are not detailed here.

Figure 11:
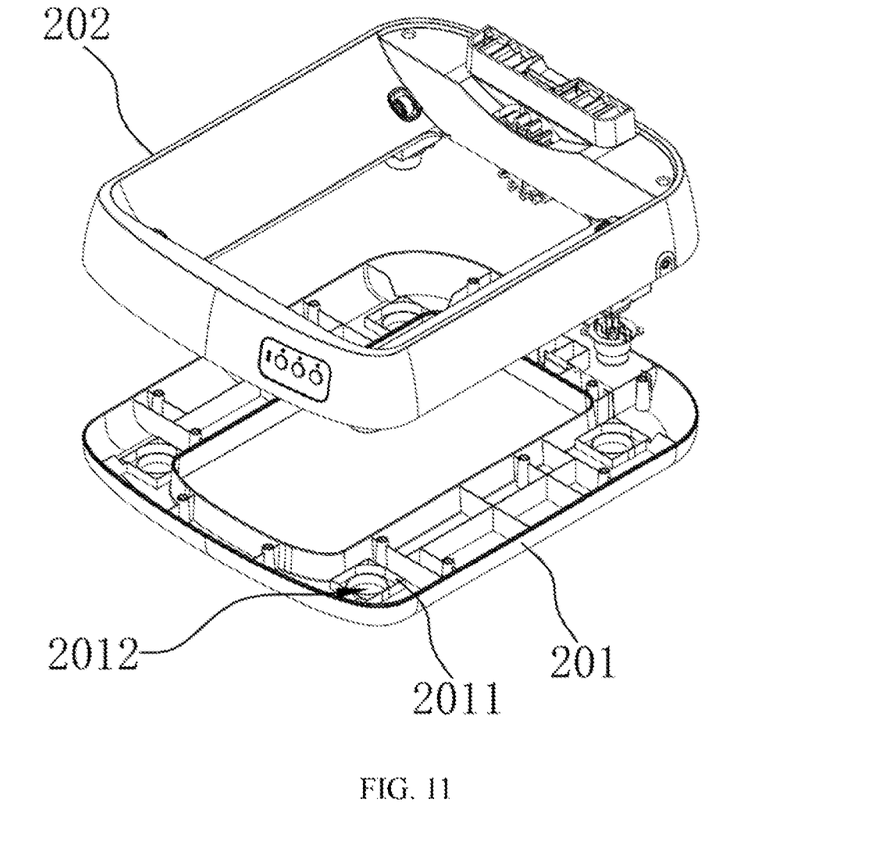
FIG. 11 is an isometric exploded view of the base of the pet litter device.
Figure 12:
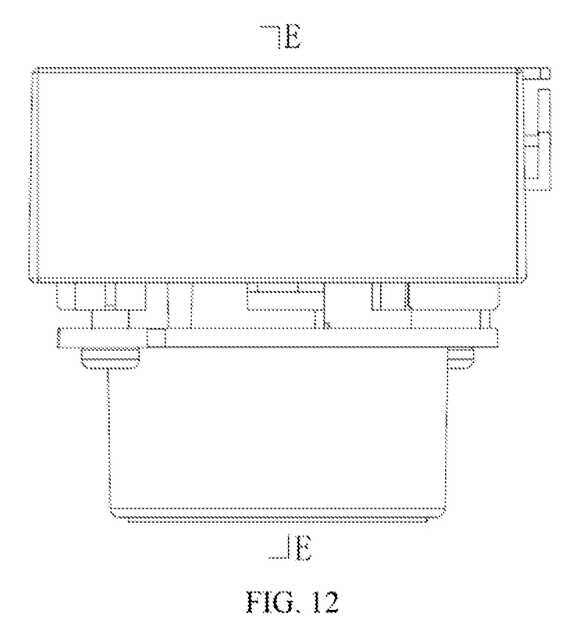
FIG. 12 is a planar view of a weight measuring mechanism of the pet litter device.

As shown in FIGS. 11 and 13, in one embodiment, the base 20 may include an upper housing 202 and a lower housing 201 that are connected to each other, for example, by screws. The upper housing 202 defines the recessed portion 21, and the opening 211 passes through the upper housing 202 and the lower housing 201.

It should be noted that the shape of the opening 211 can be chosen according to actual needs, such as a circle, a square, an ellipse, a trapezoid, and the like.

In one embodiment, the lower housing 201 defines a chamber 2011 and a through hole 2012 in communication with the chamber 2011. For example, the through hole 2012 may be located in the bottom of the chamber 2011. The support member 41, the weight sensor 42, and the leg 43 are arranged, from top to bottom, in the chamber 2011. The support member 41 is securely connected to the upper housing 202, and the leg 43 movably passes through the through hole 2012. Thus, the support member 41, the weight sensor 42 and the leg 43 can be held in position.

Figure 14:
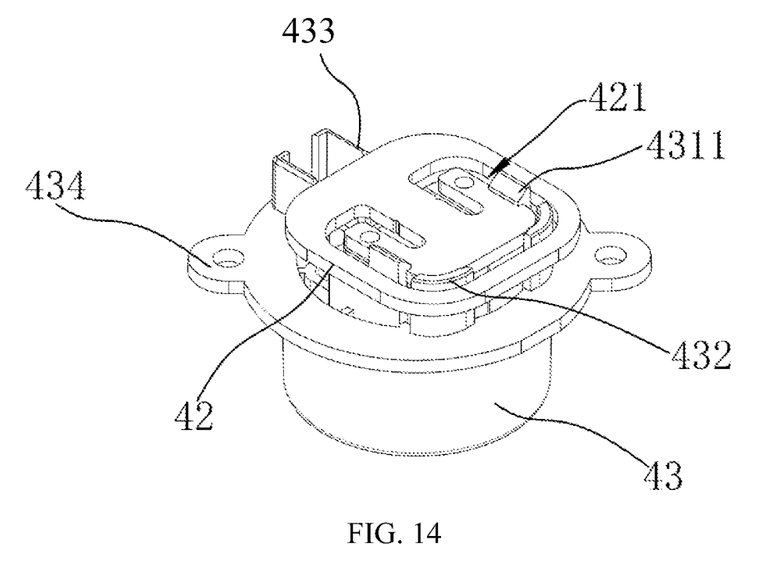
FIG. 14 is an isometric view of the weight measuring mechanism of the pet litter device.

Referring to FIGS. 13 and 14, in one embodiment, the leg 43 defines a receiving space 431 to receive the weight sensor 42 and includes two first hooks 4311 that engage an upper side 4201 of the weight sensor 42 to prevent the leg 43 from moving away from the support member 41. In one embodiment, the two first hooks 4311 protrude from the upper end surface of the leg 43 and are opposite each other and adjacent to the receiving space 431.

In one embodiment, the weight sensor 42 is fixed to the support member 41, and the weight sensor 42 is partly received in the receiving space 431 of the leg 43. When the device 100 is placed on the support surface, the leg 43 can move up a short distance so that the leg 43 can apply a push force to the bottom of the weight sensor 42. The hooks 4311 will not restrict the upward movement (i.e., moving toward the support member 41) of the leg 43. That is, the two hooks 4311 are movable, together with the support member 41, upward toward the support member 41.

As shown in FIG. 14, in one embodiment, the two limit walls 432 protrude from the upper end surface of the leg 43 toward the support member 41, and a groove 421 is defined in the weight sensor 42. The groove 421 extends along the periphery of the top of the weight sensor 42. The limit walls 432 pass through the groove 421 and abut against the inner surface of the groove 421. The limit walls 432 are to limit the movement of the weight sensor 42 in a direction parallel to the support surface. That is, while the weight sensor 42 is fixed on the support member 41, the limit walls 432 limit the movement along the top the load weight sensor 42, thereby ensuring the reliability of assembly.

In one embodiment, in order to prevent the horizontal movement of the weight sensor 42 and affect the measurement accuracy, a protrusion 433 is protruded from the upper end surface of the leg 43 toward the support member 41. Specifically, the protrusion 433 is located on the side opposite to the limit walls 432. When the weight sensor 42 moves toward the protrusion 433, the edge of the weight sensor 42 will abut against the protrusion 433, thereby restricting the weight sensor 42 from continuing to move toward the protrusion 433.

Figure 15:
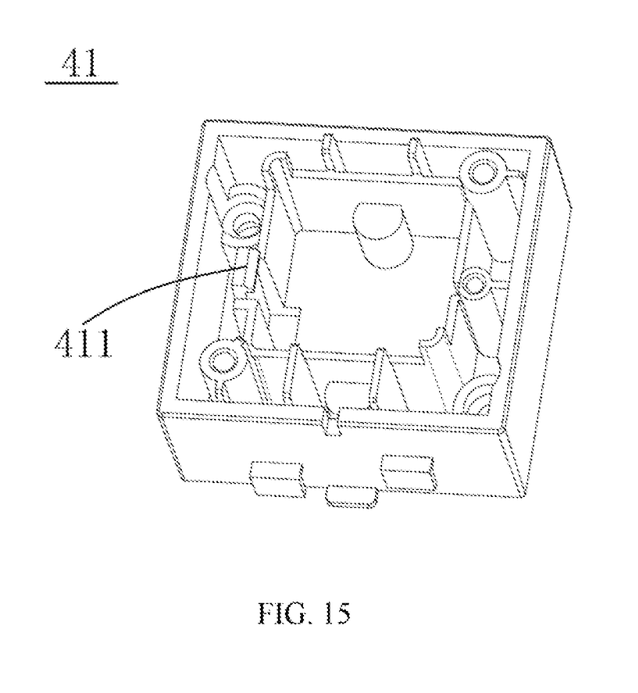
FIG. 15 is an isometric view of a support member of the weight measuring mechanism.

Referring to FIGS. 13 and 15, in one embodiment, the weight sensor 42 can be connected to the support member 41 by a fastener (e.g., a screw) or adhesive bonding. The support member 41 may include a second hook 411 that engages and is in constant contact with a lower side 4202 of the weight sensor 42 to prevent the weight sensor 42 from moving away from the support member 41. In this way, the weight sensor 42 is fixed to the support member 41, and the connection strength between the support member 41 and the weight sensor 42 is increased. In one embodiment, the weight sensor 42 may further include a protruding member 4203 protruding from the lower side 4202. The protruding member 4203 is in constant contact with the contact member 436. In one embodiment, the leg 43 further includes a post 4312 that is received in the receiving space 431, and the contact member 436 is arranged on a top 4313 of the post 4312.

Referring to FIG. 14, in one embodiment, the device may include a support assembly that includes a number of support members 41 and legs 43. The support members 41 are fixed to the base 20. The legs 43 are connected to the support members 41 and pass through the base 20, and the legs 43 can support the base 20 on the support surface.

In one embodiment, two lugs 434 are provided on each leg 43 adjacent to a corresponding support member 41. Each leg 43 is connected to a corresponding support member 41 by a bolt passing through the lug 434 of the leg 43. In addition, the support members 41 and the legs 43 have the above-described structure for holding weight sensors 42 in position. In the case where weight sensors 42 are omitted, the support members 41 and the legs 43 are connected to each other, respectively, to form the support assembly. In this way, the support members 41 and the legs 43 can be compatible with a first mode without the weight sensors 42 and a second mode with the weight sensors 42, which can save costs and increase product diversity.

In one embodiment, the number of the legs 43 is four, and the number of the support members 41 is four. However, the numbers of the legs 43 and the support members 41 may change according to actual needs.

In one embodiment, the bottom of each leg 43 is provided with an anti-slip pad 435, and the anti-slip pad 435 is flat. On the one hand, the anti-slip pads 435 can prevent the device 100 from slipping and moving sideways when placed on the support surface. On the other hand, the anti-slip pads 435 are flat, which to make them more stable when they are in contact with the support surface.

In summary, embodiments of the present disclosure provide a pet litter device that includes a drum 10 rotatably and partly received in the recessed portion 21. The recess surface 212 and a portion of the outer lateral surface 101 of the drum 10 that faces the recess surface 212 define a gap d therebetween and form a passage 30 in communication with the opening 211. If tiny objects (e.g., cat litter particles) enter the passage 30, they will be guided by the recess surface 212, pass through the opening 211, and finally fall on support surface where the device 100 is placed. A user can then clean up the tiny objects (e.g., cat litter particles) on the support surface. Since the litter particles entering the passage 30 between the drum 10 and the recessed portion 21 can directly fall on the support surface, the litter particles will not accumulate between the drum 10 and the recessed portion 21, which can prevent the output gear 60 of the drive motor and the transmission gear from being jammed. This also avoids the problem that the litter particles accumulated between the drum 10 and the base 20 cause friction or adversely affect the rotation of the drum 10.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A litter device for a pet, comprising:
   a base configured to be placed on a support surface, the base comprising a recessed portion that comprises a recess surface defining an opening passing through the base;
   a drum rotatably connected to the base and partly received in the recessed portion, the drum comprising an outer lateral surface, the recess surface and a portion of the outer lateral surface that faces the recess surface defining a gap therebetween and forming a passage in communication with the opening, and the recess surface configured to guide litter particles entering the passage to pass through the opening to exit the base and fall on the support surface that is external to the base;
   a weight measuring mechanism, wherein the weight measuring mechanism is arranged in the base and is configured to measure a weight of the litter device;
   wherein the weight measuring mechanism comprises a support member, a weight sensor, and a leg, the support member is arranged in the base. the weight sensor is connected to and arranged under the support member, the weight sensor is connected to and arranged above the leg, and the leg passes through the base to be in contact with the support surface;
   wherein the leg defines a receiving space to receive the weight sensor and comprises two first hooks that engage an upper side of the weight sensor to prevent the leg from moving away from the support member;

wherein the support member comprises a second hook that engages and is in constant contact with a lower side of the weight sensor to prevent the weight sensor from moving away from the support member;

wherein the weight sensor further comprises a protruding member protruding from the lower side, the leg comprises a contact member, the protruding member is in constant contact with the contact member.

2. The litter device of claim 1, wherein an area of the opening and an area of a cross-section of a portion of the drum received in the recessed portion satisfy the following relationship: $3A/5 \leq S \leq 2A/3$, where S represents the area of the opening, and A represents the area of the cross-section of a portion of the drum received in the recessed portion.

3. The litter device of claim 1, wherein the recess surface extends downwardly from a top end of the base.

4. The litter device of claim 3, wherein the recess surface is a concave surface.

5. The litter device of claim 1, wherein the passage comprises an inlet formed between a top end of the base and the outer lateral surface, and an outlet formed between an edge of the opening and the outer lateral surface, and the inlet is smaller in size than the outlet.

6. The litter device of claim 5, wherein a distance between the outer lateral surface and the recess surface gradually increases from the inlet to the outlet.

7. The litter device of claim 1, wherein the base comprises an upper housing and a lower housing that are connected to each other, the upper housing defines the recessed portion, the opening passes through the upper housing and the lower housing, the lower housing defines a chamber and a through hole in communication with the chamber, the support member, the weight sensor, and the leg are arranged in the chamber, the support member is securely connected to the upper housing, and the leg passes through the through hole.

8. The litter device of claim 1 further comprising a plurality of support members and a plurality of legs, wherein the support members are arranged in the base, the legs are connected to the support members, respectively, and the legs pass through the base to be in contact with the support surface.

9. The litter device of claim 1, wherein the leg further comprises a post that is received in the receiving space, and the contact member is arranged on a top of the post.

10. The litter device of claim 1, wherein the two first hooks are movable upward toward the support member.

* * * * *